US006415735B1

(12) United States Patent
Rogers

(10) Patent No.: US 6,415,735 B1
(45) Date of Patent: Jul. 9, 2002

(54) GEAR WEAR INDICATOR

(76) Inventor: E. Mark Rogers, 835 Big Branch Rd., Clyde, NC (US) 28721

( * ) Notice: Subject to any disclaimer, the term of this patent is extended or adjusted under 35 U.S.C. 154(b) by 0 days.

(21) Appl. No.: 09/540,074

(22) Filed: Mar. 31, 2000

(51) Int. Cl.$^7$ .............................. G01D 21/00; F16D 3/00
(52) U.S. Cl. ...................... 116/208; 116/DIG. 1; 464/23
(58) Field of Search .................. 116/208, 200, 116/201, 1, DIG. 1; 403/27; 74/457; 464/23, 157

(56) References Cited

U.S. PATENT DOCUMENTS

| | | | | |
|---|---|---|---|---|
| 1,426,956 A | * | 8/1922 | Case .......................... 138/36 |
| 1,913,564 A | * | 6/1933 | Raymond .................... 138/36 |
| 3,678,883 A | * | 7/1972 | Fischer ....................... 116/208 |
| 3,897,116 A | | 7/1975 | Carpenter .................... 384/297 |
| 3,922,999 A | * | 12/1975 | Meginnis .................... 116/208 |
| 4,322,966 A | * | 4/1982 | Golabek ......................... 73/7 |
| 4,576,499 A | | 3/1986 | Smith ........................... 403/27 |
| 4,650,441 A | | 3/1987 | Lepson ......................... 464/16 |
| 5,348,515 A | * | 9/1994 | Miller ......................... 474/152 |
| 5,451,110 A | | 9/1995 | Gams et al. ................. 384/624 |
| 5,540,448 A | | 7/1996 | Heinzen ...................... 277/321 |
| 5,718,633 A | | 2/1998 | Gehrke ......................... 464/23 |
| 5,978,500 A | * | 11/1999 | Broughton ................... 382/141 |
| 6,178,824 B1 | * | 1/2001 | Hayakawa et al. ........... 73/828 |
| 6,289,735 B1 | * | 9/2001 | Dister et al. .................. 73/579 |

* cited by examiner

Primary Examiner—Diego Gutierrez
Assistant Examiner—R. Alexander Smith
(74) Attorney, Agent, or Firm—Joseph T. Guy; Nexsen Pruet Jacobs & Pollard, LLC

(57) ABSTRACT

The present invention is directed to a gear wear indicator. The gear wear indicator comprises at least one indicator tooth where the indicator tooth comprises a cavity. An indicator element is located within the cavity and is visually altered when the cavity is ruptured. A viewing port is provided for viewing the indicator element in the cavity.

19 Claims, 3 Drawing Sheets

GEAR WEAR INDICATOR

BACKGROUND

The present invention is related to gears as typically found in machines. In particular, the present invention relates to gears having a wear indicator and an indicator viewing port whereby excessive wear in the gear can be realized prior to catastrophic failure.

The use of gears is a well known art. Gears are typically used to insure that two or more components move in concert with one another. Gears are known to progressively wear and it is known to be critical that the degree of wear be monitored such that the gears can be replaced prior to a catastrophic failure. One technique for inspection of wear is to disassemble the equipment for visual inspection of the gear teeth. This is time consuming and typically requires stopping the process utilizing the gear.

Various methods for providing a wear indicator system have been adopted. U.S. Pat. No. 5,451,110, for example, provides a chamber located in close proximity to a wear surface. The chamber is filled with a wear indicator which leaks onto the wearing surface upon rupture of the chamber. The wear indicator is a visual indication that wear is severe and that the part requires replacement. The technique has deficiencies in that it requires the wear indicator to migrate to an exterior location prior to detection. In a gear coupling with a low angular velocity, as used with parallel shafts for example, there may be no mechanical force sufficient for the material to migrate. This is particularly true if the gear is moving relatively slowly and centrifugal force is insufficient to force the material out of the gear coupling. Also if multiple gears are present in a close proximity the actual gear which is worn may be indeterminate and all of the gear couplings would have to be disassembled until the worn gear was located positively. Even then there may be multiple failures and locating a gear that is worn does not insure that others did not wear as well.

U.S. Pat. No. 4,650,441 provides an inspection port for viewing a modified gear tooth. While this technique has certain advantages, the major deficiency is the fact that the plug must be removed for inspection of the gear which adds maintenance items. This is undesirable.

Methods of measuring an electrical short circuit in a worn gear have been provided in U.S. Pat. Nos. 5,540,448 and 3,897,116. These require special equipment and training to inspect for wear which is undesirable. It is more advantageous to have a wear indicator which requires no special training and which can be monitored by visual inspection.

There still exist a need for a gear wear indicator which is rapid, convenient and which requires no additional tools or training to monitor. Such a device is provided by the present invention.

SUMMARY

It is an object of the present invention to provide a gear wear indicator which is immediate and definitive.

It is another object of the present invention to provide a gear wear indicator which does not require any special tools or training.

A particular feature of the present invention is the fact that the gear wear indicator does not require any maintenance.

These and other advantages are provided in a gear comprising a gear wear indicator. The gear wear indicator comprises at least one indicator tooth where the indicator tooth comprises a cavity. An indicator element is located within the cavity and is visually altered when the cavity is ruptured. A viewing port is provided for viewing the indicator element in the cavity.

A preferred embodiment is provided in a gear comprising a gear wear indicator wherein the gear wear indicator comprises at least one indicator tooth. The indicator tooth comprises a cavity with an indicator element therein wherein the indicator element departs from the cavity when said cavity is ruptured. A viewing port is provided for viewing the cavity and determining if the indicator element has departed indicating the cavity has ruptured and the gear is worn.

Yet another preferred embodiment is provided in a gear comprising a gear wear indicator. The said gear wear indicator comprises at least one indicator tooth wherein said indicator tooth comprises a cavity. The cavity comprises an upper chamber and a lower chamber with a membrane between the upper chamber and lower chamber. When the cavity is ruptured a pressure difference between the cavities causes the membrane to rupture or deflect which is observed through a viewing port.

DETAILED DESCRIPTION

Throughout the following description similar elements are numbered accordingly. Primed numbers indicate an equivalent element to the unprimed number.

Figure 1:
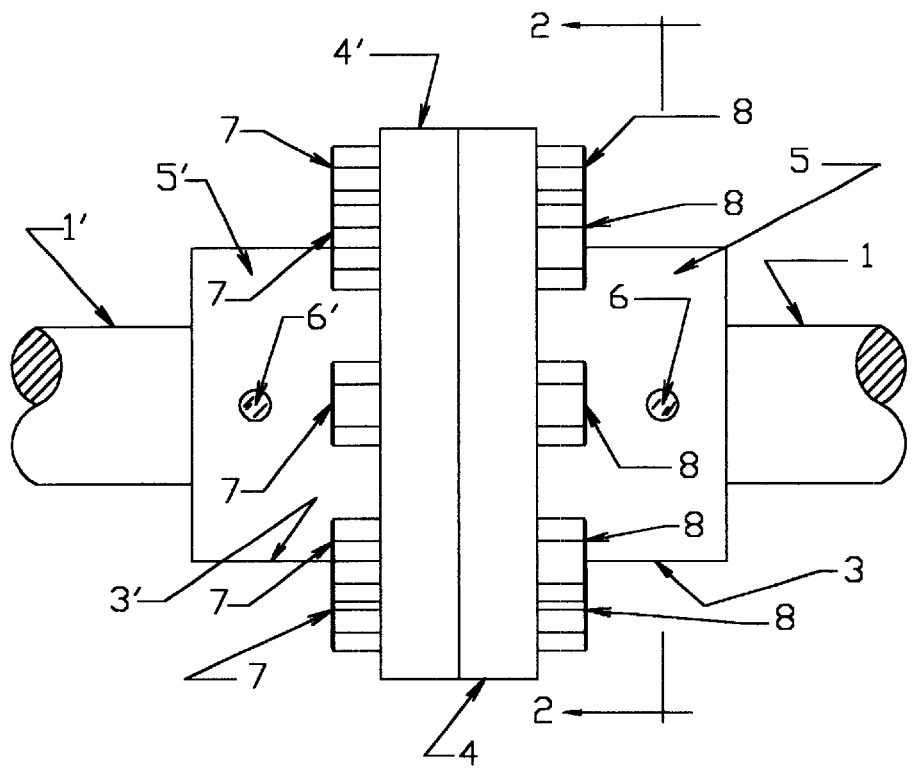
FIG. 1 is a side view of the inventive gear wear indicator as applied to a gear coupling for coupling shafts.

FIG. 1 is a side view of a pair of inventive matched couples as used to couple two parallel shafts, 1 and 1'. The couple, generally represented at 3, comprises a flange, 4, and a collar, 5. The shaft, 1, is received within the collar, 5. The shaft, 1, and collar, 5, have mating gear teeth which are shown in other figures. The mating gear teeth insure that the shaft and couple rotate in concert. At least one viewing port, 6, the significance of which will be further described herein, is provided on the collar, 5, of the couple, 3. The flanges, 4 and 4', of the matching couples are secured together such that the couples, and shafts, rotate as a single unit. The method of securing the flanges is not particularly limiting. Most preferred is a bolt, 7, and nut, 8, as illustrated. Other methods known in the art of securing one flange to another are acceptable and within the teachings of this invention including welding, rivets, stud and groove combinations and the like.

Figure 2:
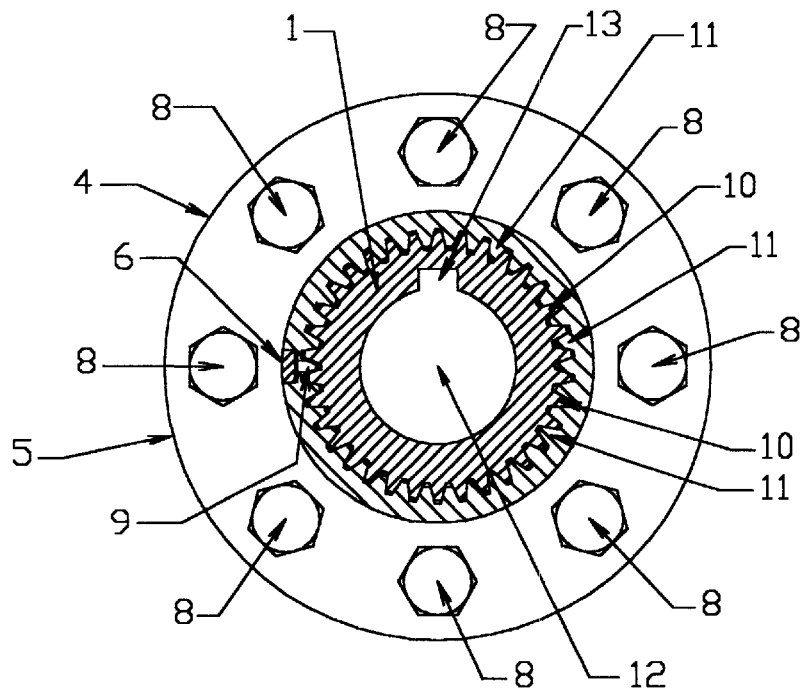
FIG. 2 is a cross-sectional view taken along line 2—2 of FIG. 1.

FIG. 2 is a cross-sectional view taken along line 2—2 of FIG. 1. The flange, 4, collar, 5, and nut, 8, are as described in reference to FIG. 1. The viewing port, 6, forms the exterior of a cavity, 9, such that the contents of the cavity can be viewed through the viewing port. The cavity, 9, is a void in an indicator tooth of the collar which will be explained with more detail in reference to FIG. 3. The shaft, 1, comprises a multiplicity of external teeth, 10, which mate with the internal teeth, 11, of the collar, 5. The shaft, 1, may further comprise a bore, 12, and key slot, 13, as is common in the use of a shaft. Alternatively, the shaft, 1, can be used as a secondary shaft, also referred to in the art as a hub, wherein a primary shaft is received by the bore, 12, of the secondary shaft.

Figure 3:
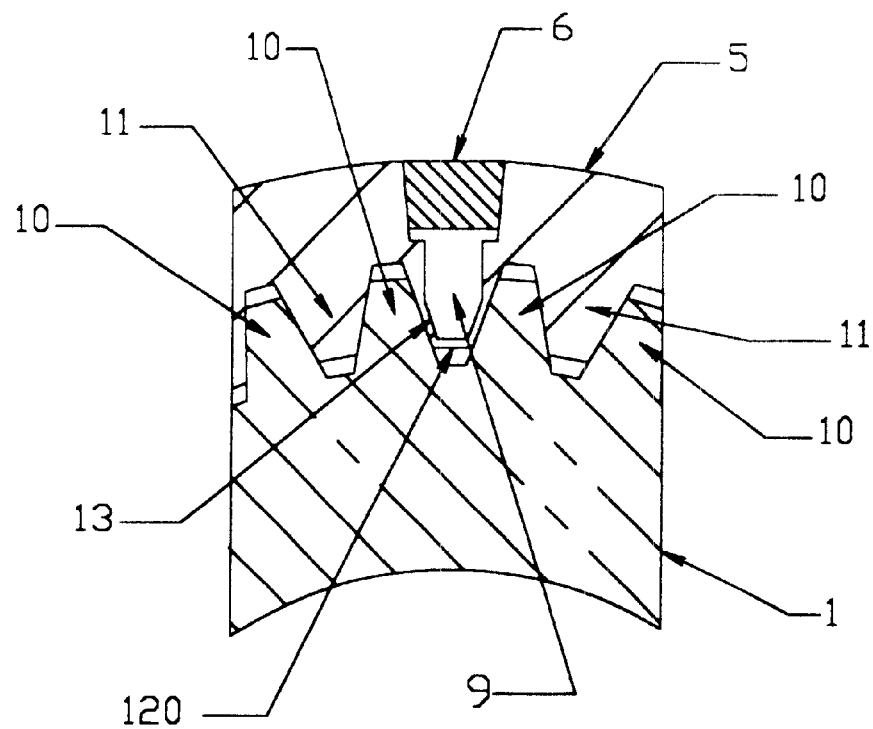
FIG. 3 is an exploded view of the inventive gear wear indicator.

FIG. 3 provides a detailed view of the inventive device. In FIG. 3 the shaft, 1, comprises a multiplicity of external teeth, 10. The collar, 5, comprises a multiplicity of internal teeth, 11, which mate with the external teeth of the shaft as realized to one skilled in the art. The collar, 5, further comprises at least one tooth which is an 4 indicator tooth, 120. The indicator tooth, 120, comprises a cavity, 9, which comprises an indicator element therein. The indicator element is viewed through the indicator port, 6. As the external surface of the indicator tooth, 120, wears away the cavity wall, 13, becomes thinner and eventually ruptures at which point the indicator element is altered and the wear is realized by viewing the altered indicator element through the indicator port.

The cavity wall is the portion of the indicator tooth which is between the cavity and the exterior of the tooth which engages with the mating gear. The thickness of the cavity wall determines the amount of wear necessary for the cavity wall to be ruptured and is dependent on the application.

The viewing port may be tapered as illustrated in FIG. 3. If the viewing port is installed by a pressing technique a tapered viewing port is preferred. The viewing port may be manufactured from a variety of well known materials provided the viewing port is transparent under the illumination conditions used. The viewing port may be planar or may incorporate a concave or convex face to magnify or minimize the indicator element.

The indicator element is an element which is visually altered due to a rupture of the cavity wall. Three classes of indicator elements are contemplated in the present invention.

The first class of indicator element is the presence of a substance in the cavity which departs upon rupture of the cavity wall. Particularly contemplated for the first class of indicator elements are gases or liquids which are visible under certain illumination or which are made visible under certain illumination conditions by the incorporation of colorants. Particularly preferred are low molecular weight halogenated hydrocarbons, low molecular weight perhalogenated alkanes or low molecular weight perhalogenated alkenes. Particularly preferred are halogenated methane, ethane or propane with an appropriate colorant added as well known in the art. Most preferred as an indicator element is 1,1,1,2-tetrafluoroethane with an appropriate colorant added as well known in the art.

The second class of indicator element is characterized by the absence of a material. In this embodiment the inside walls of the cavity are visible and act as the indicator element. When the cavity is ruptured lubricant enters the cavity. In the second class of indicator elements the cavity may be maintained under a pressure which is lower than ambient pressure. When the cavity ruptures lubricating grease is drawn into the cavity and the lubricating grease is observed in the viewing port. Alternatively, the cavity may be maintained at ambient pressure but upon rupture the lubricating grease is forced into the ruptured cavity by the mechanical force associated with gears being in contact. As a preferred embodiment markings can be added to the walls of the cavity such as "GEAR OK" which are obscured after rupture due to the presence of lubricating grease or similar material.

The third class of indicator elements are physical structures which are physically altered as a result of rupture of the cavity wall. Exemplary examples are further described in reference to FIGS. 4 and 5.

Figure 4:
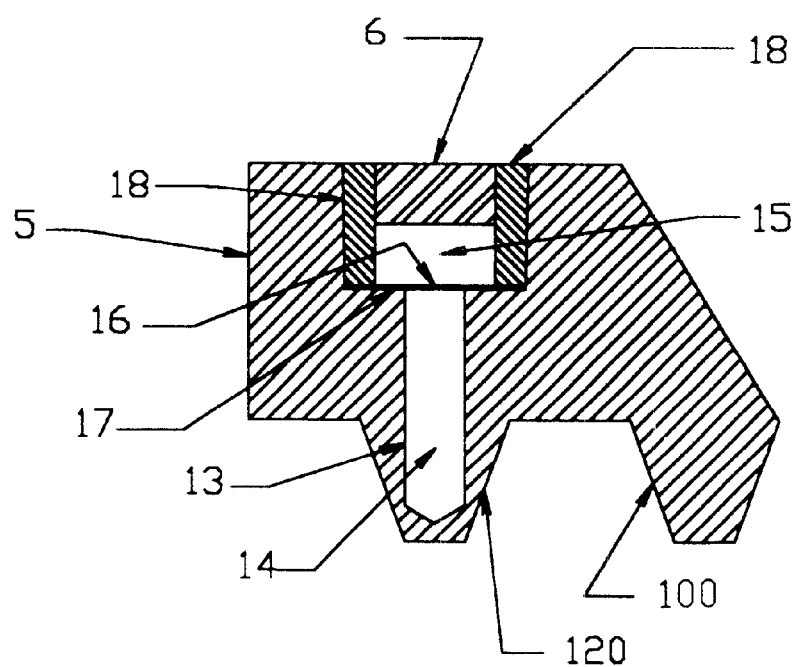
FIG. 4 is a cross-sectional view of an embodiment of the present invention.
Figure 5:
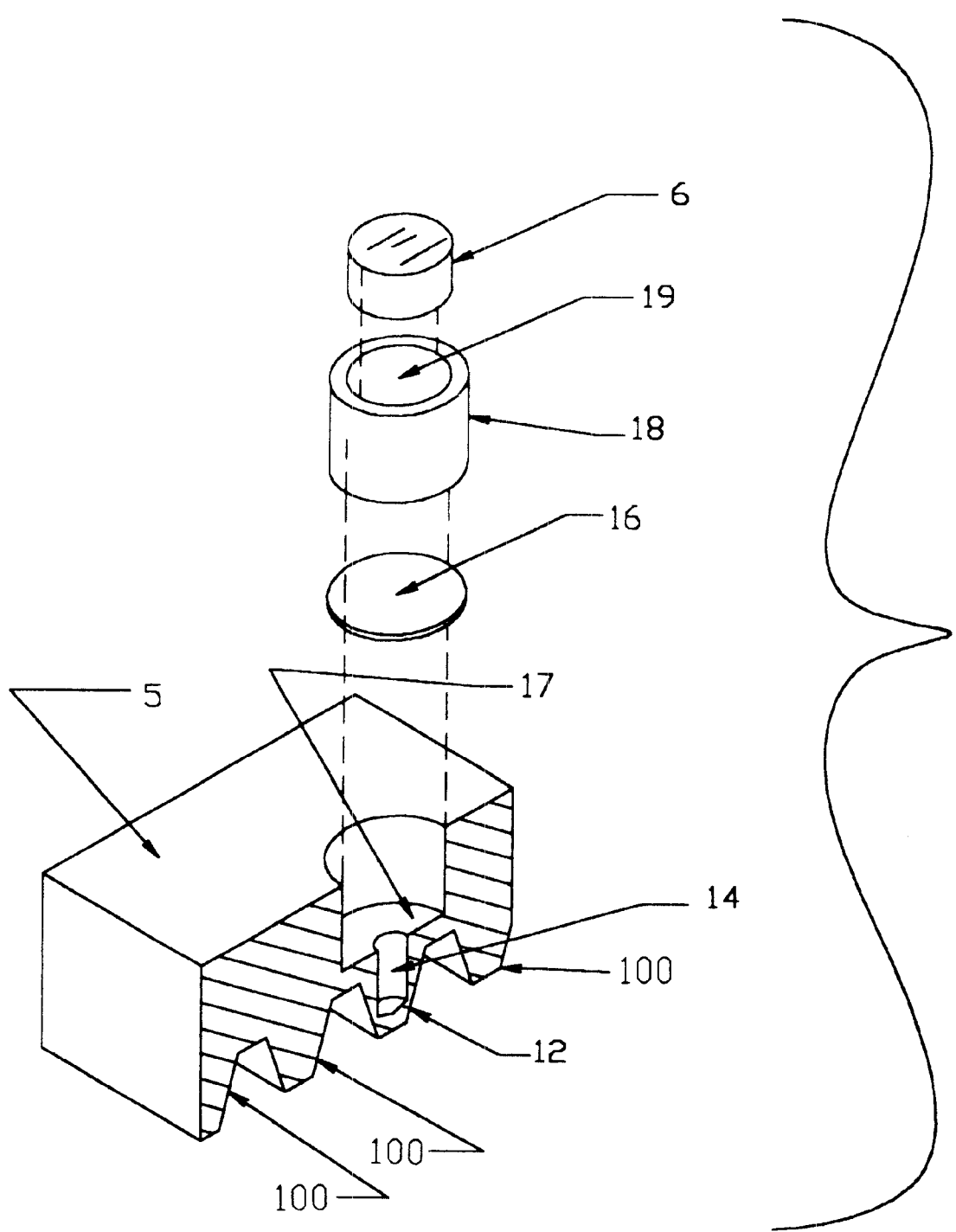
FIG. 5 is an exploded view of an embodiment of the present invention.

An embodiment of present invention will be described relative to FIGS. 4 and 5. FIG. 4 is a cross-sectional view of an embodiment of the present invention wherein rupture of the cavity causes a physical structure to be altered in a visually distinguishable manner. FIG. 5 is an exploded perspective view of the embodiment of FIG. 4 with a partial cutaway. In FIGS. 4 and 5 the collar, 5, internal teeth, 100, indicator tooth, 12, and cavity wall, 13, are as described previously. The embodiment in FIGS. 4 and 5 illustrate the use of the present invention as used with a planar gear, such as those commonly referred to in the art as a rack gear. Planar gears are commonly employed with a drive system wherein a worm gear, pinion gear, or similar type, drive mechanism is employed.

The cavity illustrated in FIG. 4 and 5 comprises a lower chamber, 14, and upper chamber, 15. The lower chamber and upper chamber are separated by a membrane, 16. Under normal conditions the pressure in the upper chamber and lower chamber are the preferably approximately the same with both being substantially different from ambient pressure. When the cavity wall, 13, is ruptured the pressure in the lower chamber, 14, equilibrates with the ambient pressure. After rupture of the cavity wall the pressure difference between the upper chamber and the lower chamber is sufficient to deflect or rupture the membrane. The deflected, or ruptured, membrane is observed through the viewing port, 6. As illustrated in FIG. 5, the chamber is preferably stepped with the lower chamber having a smaller diameter than the upper chamber. The difference in diameter forms a ledge, 17, upon which the membrane, 16, rest. An optional, but preferred, ring, 18, is pressed into the upper chamber, 15, to secure the membrane, 16, between the ring and ledge. The pressure exerted on the membrane by the plug must be sufficient to eliminate leaks around the membrane since this could defeat the intent of the membrane. A sealant between the membrane and ledge is preferable. The viewing port, 6, may be pressed into a void, 19, of the ring, 18. As an optional embodiment the viewing port, 6 and ring, 18, could be a single piece. The thickness of the viewing port is preferably less than the thickness of the ring to allow an upper chamber to be formed.

The manufacture of the present invention is within the ability of a person having ordinary skill in the art. The gear can be cast, or otherwise manufactured, with the cavity in place or the cavity can be formed by drilling, or otherwise machining, the appropriate cavity. The viewing port and optional ring are preferably pressed into the cavity to the appropriate depth. Alternatively, the cavity may comprise threads which match threads on the viewing port and/or ring.

The membrane may be any material which ruptures or deflects as a result of a pressure differential. Preferably, the membrane is rigid enough such that minor pressure fluctuations which result from temperature gradients are not visualized. Particularly preferred is an aluminum membrane since heat would have minimal impact. An aluminum membrane with a thickness of approximately 0.0005 to 0.001 inches is particularly suitable.

What is claimed is:

1. A gear comprising a gear wear indicator wherein said gear wear indicator comprises:

at least one indicator tooth wherein said indicator tooth comprises a cavity comprising an indicator element and said indicator element is visually altered when said cavity is ruptured;

a viewing port for viewing said indicator element in said cavity.

2. The gear of claim 1 wherein said indicator element is a substance which departs from said cavity when said cavity ruptures.

3. The gear of claim 2 wherein said substance is chosen from a group consisting of a liquid and a gas.

4. The gear of claim 1 wherein said indicator element comprises at least one substance chosen from a group consisting of a low molecular weight halogenated hydrocarbon, a low molecular weight perhalogenated alkane and a low molecular weight perhalogenated alkene.

5. The gear of claim 4 wherein said indicator element is chosen from a group consisting of halogenated methane, halogenated ethane and halogenated propane.

6. The gear of claim 1 wherein said indicator element is a cavity wall.

7. The gear of claim 1 wherein said indicator element is a physical structure.

8. The gear of claim 7 wherein said cavity comprises an upper chamber and a lower chamber.

9. A gear comprising a gear wear indicator wherein said gear wear indicator comprises:
   at least one indicator tooth wherein said indicator tooth comprises a cavity comprising an indicator element and said indicator element is visually altered when said cavity is ruptured;
   a viewing port for viewing said indicator element in said cavity;
   wherein said indicator element is a physical structure;
   wherein said cavity comprises an upper chamber and a lower chamber; and
   further comprising a membrane between said upper chamber and said lower chamber.

10. The gear of claim 9 wherein said membrane comprises aluminum.

11. A gear comprising a gear wear indicator wherein said gear wear indicator comprises:
   at least one indicator tooth wherein said indicator tooth comprises a cavity comprising an indicator element wherein said indicator element departs from said cavity when said cavity is ruptured; and
   a viewing port for viewing said cavity.

12. The gear of claim 11 wherein said indicator element is chosen from a group consisting of a liquid and gas.

13. The gear of claim 11 wherein said indicator element comprises at least one substance chosen from a group consisting of a low molecular weight halogenated hydrocarbon, a low molecular weight halogenated alkane and a low molecular weight halogenated alkene.

14. The gear of claim 13 wherein said indicator element is chosen from a group consisting of halogenated methane, halogenated ethane and halogenated propane.

15. A gear comprising a gear wear indicator wherein said gear wear indicator comprises:
   at least one indicator tooth wherein said indicator tooth comprises a cavity wherein said cavity comprises an upper chamber and a lower chamber;
   a membrane between said upper chamber and said lower chamber; and
   a viewing port for viewing said membrane.

16. The gear of claim 15 wherein said membrane comprises aluminum.

17. The gear of claim 15 further comprising a ring in said upper chamber.

18. The gear of claim 17 wherein said ring comprises a void and said viewing port is received in said void.

19. A gear comprising a gear wear indicator wherein said gear wear indicator comprises:
   at least one indicator tooth wherein said indicator tooth comprises a cavity with at least one cavity wall and said cavity comprises a substance selected from a group consisting of a liquid and a gas wherein said substance exits said cavity when said cavity wall is ruptured;
   a viewing port for viewing said substance in said cavity.

* * * * *